United States Patent [19]

Billings et al.

[11] Patent Number: 5,678,238
[45] Date of Patent: Oct. 14, 1997

[54] MICRO ENCAPSULATION OF HYDROCARBONS AND CHEMICALS

[75] Inventors: Richard Billings, 311 W. 7th, Chelsea, Okla. 74016; Lyle D. Burns, Bartlesville, Okla.

[73] Assignee: Richard Billings, Chelsea, Okla.

[21] Appl. No.: 527,409

[22] Filed: Sep. 13, 1995

[51] Int. Cl.⁶ .................................................. G21F 9/00
[52] U.S. Cl. .......................... 588/14; 588/252; 588/256; 210/702; 210/751; 405/128; 134/29
[58] Field of Search ........................... 588/14, 252, 256; 210/702, 751; 405/128; 134/29

[56] References Cited

U.S. PATENT DOCUMENTS

| | | | |
|---|---|---|---|
| 4,347,150 | 8/1982 | Arpin | 252/135 |
| 4,482,481 | 11/1984 | Bandyopadhyay et al. | 252/628 |
| 4,505,851 | 3/1985 | Funabashi et al. | 252/628 |
| 4,518,508 | 5/1985 | Conner | 210/751 |
| 4,581,162 | 4/1986 | Kawamura et al. | 252/628 |
| 4,600,514 | 7/1986 | Conner | 210/751 |
| 4,622,175 | 11/1986 | Tamata et al. | 252/628 |
| 5,295,761 | 3/1994 | Heacock et al. | 405/128 |
| 5,306,351 | 4/1994 | Anderson | 134/40 |
| 5,352,296 | 10/1994 | Wittel et al. | 134/2 |
| 5,527,982 | 6/1996 | Pal et al. | 588/256 |

*Primary Examiner*—Ngoclan Mai
*Attorney, Agent, or Firm*—Molly D. McKay, PC

[57] ABSTRACT

A method for cleaning contaminated surfaces or for cleaning bulk contamination of hydrocarbons or chemicals. To clean hydrocarbon or chemical contaminated surfaces, a basic aqueous silica solution is sprayed onto the contaminated surface and allowed to dry. The resulting dry material will flake off, leaving a cleaned surface, without damaging the surface. To clean bulk contamination of hydrocarbons or chemicals, the basic silica solution is mixed with hydrocarbons or chemicals and then an acidic aqueous polymer solution is added and mixed. An amorphous silica material is immediately formed which permanently encapsulates the hydrocarbons or chemicals and which dries to an inert powder.

16 Claims, No Drawings

५,६७८,२३८

MICRO ENCAPSULATION OF HYDROCARBONS AND CHEMICALS

BACKGROUND OF THE INVENTION

1. Field of the Invention

A method for micro encapsulating hydrocarbons and chemicals, and more particularly, a method of cleaning contaminated surfaces of equipment, concrete pavement, etc. and remediation of, or emergency response to bulk contamination such as that found at chemical spills or hazardous waste sites.

2. Description of the Related Art

In recent years, public awareness has been raised regarding the need to remediate old hazardous waste sites and to clean up new spills of hydrocarbons or chemicals in order to prevent further contamination of the environment. One group of methods used in emergency response or clean up is to remove all of the contamination with absorbents, package it in some type of containment vessel, and transport it to an approved hazardous waste disposal facility, usually an EPA approved incinerator or landfill. The absorbent, which has absorbed the contamination, usually exhibits the characteristics of hazardous waste material, such as ignitability, corrosivity, reactivity or toxicity, ultimately adding to the volume of hazardous waste. These methods can entail great expense associated with transportation of large amounts of waste materials and landfill fees.

Other methods used in remediation and clean up of hazardous wastes involve immobilization technologies such as stabilization or solidification. Although transportation of hazardous materials is still required, these processes utilize inexpensive, pozzolanic, siliceous, or zeolitic materials that when combined with lime or cement and water form cementitious substances. The contaminant becomes physically entrapped in the pozzolan matrix. The final product varies from a soft, fine grained material to a hard, cohesive material similar in appearance to concrete. Stabilization processes reduce the reactivity of a waste by changing its chemical state or by physical entrapment. Solidification processes refer to techniques that macro encapsulate or mechanically bind the waste in a solid block of material with high structural integrity, often referred to as a monolith. The monolith can be as small as the contents of a steel drum or encompass the entire waste disposal site, called a monofill. Contaminant migration is restricted by vastly decreasing the surface area exposed to leaching. The most important factor in determining whether a particular immobilization process is effective in treating a given waste is the reduction in the short-term and long-term leachability of the waste. Inorganic wastes are effectively treated by immobilization technologies as long as the pH remains highly alkaline; however, organic constituents are easily leached from the waste form. Freeze-thaw and wet-dry cycles cause fracturing of the matrix, resulting in increased liquid-solid interfaces where leaching occurs.

Therefore, immobilization technologies are not effective at long-term immobilization of toxic organic materials. Many immobilization processes can pass regulatory leaching tests, but these tests do not indicate the potential for leaching after intermediate to long-term environmental exposure. Widespread acceptance of immobilization processes will be hampered until the long-term durability of the waste form can be demonstrated.

Other ex situ and in situ remediation methods utilize biological treatment of contaminated soils. Bioremediation is emerging as a successful innovative technology for restoring certain contaminated sites partially because of the low capital and operating costs that are required. However, bioremediation is not a universal technique and it requires a substantial time investment ranging from a few months to years. Furthermore, bioremediation has several rate limiting factors that affect its degree of success in meeting regulatory standards for remediation technologies. These limitations include oxygen content and availability, moisture content, nutrient content and availability, contaminant bioavailability and soil chemistry, metabolic limitations, bacterial population dynamics, i.e., nutrient competition and predation, and optimum temperature.

The present invention involves an ex situ or in situ method for permanently micro encapsulating hydrocarbons and chemicals within a silica-based matrix. This method involves the use of a single alkaline reagent when used for cleaning surfaces such as contaminated equipment or concrete pavement and use of an additional acidic reagent for treating contaminated bulk materials such as liquids, soils, sludges, etc.

One of the objects of the present invention is to provide a method for effectively cleaning surfaces of equipment, tanks and concrete pavement with a single application of reagent which will not harm the paint provided on the equipment but will penetrate to deep clean porous surfaces.

A further object of the invention is to provide a means for quickly, permanently and economically remediating a site contaminated with hydrocarbons or chemicals.

Still a further object of the invention is to provide a method for cleaning up contamination from spills which creates as a bi-product an inert powder which will not leach or be environmentally weathered at the site.

A further object of the invention is to provide a means of micro encapsulating hydrocarbon and chemical contaminants in sludges, making them non-hazardous.

Another object of the invention is to provide a method of deodorizing contaminated sites and sludges consisting of odiferous chemicals by permanently micro encapsulating the odiferous components.

Still a further object of the invention is to provide a method of treating contaminated soil in subterranean areas by injection of the micro encapsulating agents below the surface of the soil.

Still a further object of the invention is to provide a method for micro encapsulating radioactive materials, particularly naturally occurring radioactive materials, i.e., NORM. NORM are heavy radio nucleotides that emit alpha, beta and gamma radiation. Encapsulation by the present method will stop the alpha and beta radiation but not the gamma radiation. It is the beta radiation which is of most concern because scale or dust with beta radiation can enter a human's lungs and stay there causing tissue damage in the form of cancerous mutations. On the other hand, the low energy alpha radiation generally does not cause harm to the body and the gamma radiation penetrates through the body, creating only a slight risk of causing long term damage.

SUMMARY OF THE INVENTION

The present invention is a method for micro encapsulating hydrocarbons and chemicals employing a basic sodium meta silicate solution which may be sprayed onto contaminated surfaces. Upon drying, the dried material which contains the contamination can easily be removed or will flake off on its own without damage to underlying painted surfaces. In order to clean up bulk hydrocarbons or chemicals, the sodium meta silicate solution is sprayed or added to the bulk material and mixed. Next, an acidic polymer solution is sprayed or added to the bulk material and mixed whereupon the hydrocarbons and chemicals are immediately and permanently encapsulated within a resulting amorphous silica material. The amorphous silica material does not exhibit the characteristics of the waste material, such as ignitability, corrosivity, reactivity or toxicity. The encapsulated hydrocarbons or chemicals are not leachable, and are not released upon crushing of the amorphous silica material.

DETAILED DESCRIPTION OF THE PREFERRED EMBODIMENT

The present invention involves adding an alkaline, aqueous silica solution with emulsifying capacity to a hydrocarbon or chemical contaminant in order to permanently encapsulate the hydrocarbon or chemical. Alternately, the silica solution is mixed together with the hydrocarbon or chemical and then an acidic, aqueous polymer solution is added to speed up encapsulation and curing of the encapsulated hydrocarbons and chemicals.

Generally the silica solution has the following composition:

| | |
|---|---|
| Sodium or Potassium Meta Silicate | 35–55% |
| Alcohol Amine | 4–10% |
| Alkyl Sulfate Salt | 12–18% |
| Acrylic Polymer | 1–3% |
| Ethoxylated Alkyl Phenol | 2–8% |
| Polyethylene Glycol | 3–5% |
| Water | Remainder |

One alkyl sulfate salt which may be used is Niaproof® Anionic Surfactant 08. Niaproof® is a registered trademark of Niacet Corporation, Niagara Falls Boulevard and 47th Street, Niagara Falls, N.Y. 14304. Niaproof® Anionic Surfactant 08 is an aqueous solution containing 40 percent by weight of sodium 2-ethylhexyl sulfate, i.e., $C_4H_9CH(C_2H_5)CH_2SO_4Na$. It serves as an emulsifier or surfactant.

One acrylic polymer which may be used is Acusol® 820. Acusol® is a registered trademark of Rohn and Haas Company, 100 Independence Mall West, Philadelphia, Pa. 19106-2399. Acusol® 820 stabilizer is an alkali-soluble acrylic polymer with unusually high aqueous thickening and stabilizing efficiency.

One ethoxylated alkyl phenol which may be used is Triton® X-114. Triton® is a registered trademark of Union Carbide Chemicals and Plastics Company, Inc., 39 Old Ridgebury Road, Danbury, Conn. 06817-0001. Triton® X-114 is an octylphenol ethoxylate that contains an average of eight moles of ethylene oxide. Triton® X-114 is a liquid, water-soluble, nonionic surfactant that exhibits excellent wetting and detergent properties.

One polyethylene glycol which may be used is PEG 400 Glycol. PEG 400 Glycol is a polyethylene glycol with an average molecular weight of 400. It is available from The Dow Chemical Company, Midland, Mich. 48674, and is believed to impart solvency to the silica solution.

A more specific preferred silica solution has the following composition:

| | |
|---|---|
| Sodium Meta Silicate | 35–55% |
| Triethanol Amine | 4–10% |
| Sodium 2-Ethylhexyl Sulfate | 12–18% |

-continued

| | |
|---|---|
| Acrylic Polymer | 1–3% |
| Octylphenol Ethoxylate (8EO) | 2–8% |
| Polyethylene Glycol (400Mwt) | 3–5% |
| Water | Remainder |

It is important that the silica solution be strongly basic, because silica is soluble in a strongly basic solution but will precipitate at a pH of approximately 8.0.

If hydrocarbon or chemical contamination is to be cleaned off a surface, as opposed to stabilizing bulk material, the silica solution is simply sprayed on the surface to be cleaned and allowed to dry. The silica solution will penetrate porous surfaces, pulling any contamination to the surface where it will be bound up with the silica solution to form an amorphous silica material. The resulting amorphous silica material dries to a fine, inert powder which can be removed from the surface by power washing, rinsing, brushing, wiping or sweeping, or alternately, with natural rainfall or flake off with environmental weathering without further intervention, leaving behind a cleaned surface. Painted surfaces will not be damaged by the silica solution and stains in porous materials will be removed by the previously described method of cleaning employing the silica solution.

Optionally, a second reagent may be used following the silica solution for treating bulk materials, such as liquids, soils, sludges, etc. or for providing emergency response to spills of bulk materials. This second reagent is an acidic polymer solution. When bulk materials are to be treated, the silica solution is first added or sprayed onto the bulk material at approximately a 1 to 1 ratio, with two parts of silica solution being added for each one part of bulk hydrocarbon or chemical to be treated. Once the silica solution has been added, the silica solution and hydrocarbon or chemical should be mixed to cause the silica solution to emulsify the liquid contaminant. Next, the polymer solution is added and is mixed with the silica containing hydrocarbon or chemical. The normal ratio of polymer solution to silica solution is approximately 1 to 3, with one part polymer to each three parts of silica solution. However, since both the silica solution and the polymer solution are aqueous, either or both solutions may be diluted with water to a concentration which is optimum for use with the particular hydrocarbons or chemicals being treated and so that measurement of amounts of each solution will be convenient at the site where treatment will be occurring. Mixing will immediately produce an amorphous silica material within which the hydrocarbons or chemicals are micro encapsulated.

This resulting amorphous silica material does not exhibit the characteristics of the hazardous waste material, such as ignitability, corrosivity, reactivity, or toxicity, even though the original hydrocarbon or chemical micro encapsulated therein may have exhibited these characteristics before it was treated in accordance with this method. Also, the resulting amorphous silica material prevents volatilization of the hydrocarbon or chemical, thereby serving a deodorizing function. The resulting amorphous silica material is at a pH which is non-hazardous. The rate of reaction may be slowed significantly by dilution with water to allow placement underground by injection before the micro encapsulation reaction occurs. When the silica material dries, it forms an inert powder.

Generally the acidic polymer solution has the following composition:

| | |
|---|---|
| Mineral Acid or Organic Acid | 2.8–33% |
| Acrylic Polymer | 6–38% |
| Organic Dicarboxylic Acid | 0.1–3% |
| Water | Remainder |

One acrylic polymer which may be used is Acusol® 810. Acusol® 810 is a high molecular weight copolymer. The high molecular weight acrylic polymer is believed to speed up the process and dry up the micro encapsulated silica material.

The mineral acid or organic acid helps to lower the pH of the mixture. The organic dicarboxylic acid, which is preferably oxalic acid, serves as a buffering agent to maintain the pH of the mineral acid formulation above a pH of 4, i.e., the pH below which a substance is classified as hazardous.

A more specific preferred acidic polymer has the following composition:

| | |
|---|---|
| Phosphoric Acid | 2.8–33% |
| Acrylic Polymer (High Mwt) | 6–38% |
| Oxalic Acid | 0.1–3% |
| Water | Remainder |

This method may be successfully employed with a wide variety of hydrocarbons or chemicals. For example, the method has been used to treat liquid crude oils, all fuels, motor oils, lubricants, transmission fluids, hydraulic oils, antifreeze, aromatic hydrocarbons, and chemicals including certain halocarbons, oxygenated hydrocarbons, amines, inorganic acids, and selected heavy metals. The ratios of silica solutions and polymer solutions may need to be varied slightly, depending on the hydrocarbon or chemical to be treated. Obviously, because of the aqueous nature of the solutions, this method is not applicable for in-situ treatment of hydrocarbons or chemicals in bodies of water such as lakes or streams where the solutions would become highly diluted.

Although the precise mechanism by which the amorphous silica material is formed and encapsulates the hydrocarbons or chemicals is not fully understood, it is believed that when the silica solution is added to the hydrocarbons or chemicals, the non-polar hydrocarbons or chemicals become surrounded by non-polar ends of the surfactants. This orients a polar end of the surfactants outward away from and surrounding the hydrocarbons or chemicals. The polar silica associates in an ionic fashion with the polar ends of the surfactants, thus forming micelles. It is also hypothesized that when the acidic polymer solution is added, neutralization occurs causing the sodium meta silicate to be transformed to amorphous silicon dioxide, entrapping the micelles containing the hydrocarbon or chemical contaminants and the surfactants in the amorphous silica matrix. That acid/base reaction is thought to be as follows:

$$3Na_2SiO_3 + 2H_3PO_4 \rightarrow 2Na_3PO_4 + 3SiO_2 + 3H_2O$$

where sodium meta silicate and phosphoric acid, react to form sodium phosphate, silica dioxide and water.

The mechanistic effect of the acrylic polymer on micro encapsulation is not fully understood. Also, the mechanism of micro encapsulation used for surface cleaning which does not employ the acid acrylic polymer is not fully understood.

TEST RESULTS

Micro Encapsulation of Hydrocarbons and Chemicals

EXAMPLE 1

Three ml of kerosene was added to a wide mouth jar followed by three ml of alkaline silica reagent and three ml of water (optional). The solution was swirled lightly and immediately an emulsion formed. One ml of the acidic polymer solution was added as a curing agent. The solution was swirled to homogenize the resultant mixture while micro encapsulation occurred. Within 5 to 30 seconds the solution turned into a firm solid that could be broken into soft chunks with a spatula. The pH of the wet solid was between 7 to 8 to optimize micro encapsulation process. The wet, solid silica, when placed on a spatula and held under a flame, was not flammable. When the sample was allowed to air dry, it was still not flammable. The dry, solid micro encapsulated kerosene had a fluffy white powdery appearance and a fine, sandy feel when rubbed between the fingers and contained no odor.

Used motor oil, crude oil or a host of other hydrocarbons and chemicals may be similarly micro encapsulated. The end result is the same. Dark colored substances, such as crude oil, tend to lighten to a light brown color when dried. Micro encapsulation is immediate, but changes are noticed in the substance as the drying/curing process occurs. The micro encapsulated substances do not form a hydrocarbon sheen when washed in a beaker of water. This indicates the utility of the process to form micro capsules that are stable to leaching and other environmental weathering. Examples of chemicals that were micro encapsulated by this process include crude oils, all fuels, motor oils, lubricants, transmission fluids, hydraulic oils, antifreeze, aromatic hydrocarbons, and chemicals, including certain halocarbons, oxygenated hydrocarbons, amines, inorganic acids, and selected heavy metals.

EXAMPLE 2

Soil contaminated with crude oil (1,590 ppm) and lead (115 ppm) were reduced to 154 ppm Total Petroleum Hydrocarbons (TPH) and less than 0.10 ppm lead with one treatment of the reagents.

EXAMPLE 3

A concrete surface contaminated with motor oil was cleaned by spraying an even coating of the alkaline silica reagent on the surface. With 30 minutes, the surface had dried, and by the next day, the contaminated oil had been lifted from the concrete and micro encapsulated by the silica. The micro encapsulated motor oil was washed away with no trace of an oil sheen, leaving the concrete surface clean and water wet. Over the next five-day period, the concrete turned back to its original lighter color leaving little or no oil stain.

EXAMPLE 4

An oilfield compressor unit, contaminated externally with oil, was brought in for maintenance. The unit was sprayed with the alkaline silica reagent. Within 30 minutes, dry thin flakes of micro encapsulated oil peeled off the compressor leaving behind a clean, painted surface. The painted surface was not damaged by this cleaning process.

Optical Microscopy

Analytical techniques and optical analysis methods were employed to evaluate the morphological characteristics of the silica cell matrix, both with and without micro encapsulated crude oil. A crude oil with known fluorescence characteristics was chosen for micro encapsulation according to the procedure of Example 1, described above, for kerosene. Optical Microscopy was used to compare a dried sample of micro encapsulated crude oil with a control sample which contained no crude oil but was simply formed when the reagents were mixed together and allowed to dry.

These samples and controls were viewed and photographed using plane polarized light and using ultraviolet (UV) light. The crude oil micro encapsulated samples showed an oil stained color under plane polarizing light, but there was no apparent free oil present in the samples. The blank, i.e., dried bi-product where no crude oil was micro encapsulated, showed no oil stained color, thus indicating the crude oil was micro encapsulated in the first sample.

The sample and blank were next viewed and photographed using UV light. Crude oil by itself is known to fluoresce when its electrons are excited by exposure to UV light, thus forming bright yellow or blue star-like pin point spots on a photograph. Silica, on the other hand, generally does not fluoresce under UV light. However, when the micro encapsulated crude oil sample and blank were viewed under the UV light, no fluorescence was observed in the sample due to free crude oil. The only fluorescence observed in either the sample or the blank was a slight fluorescence from the silica due to the irregularities in the silica cell. This mineral fluorescence which was observed and absence of organic fluorescence indicated that although the crude oil was present in the sample, it was not free, but was rather bound up within the silica matrix.

Scanning Electron Microscopy Coupled with Energy Dispersive X-Ray Analysis

Scanning Electron Microscopy (SEM) coupled with Energy Dispersive X-Ray Analysis (EDXA) was employed to examine particular silica cell surface characteristics. When photographed under a 2000-fold magnification using SEM, the micro encapsulated crude oil sample showed many cavernous chambers and pockets; however, it is believed that the crude oil is actually micro encapsulated in the matrix of the silica walls and not included in these chambers or pockets.

Using EDXA, a quantitative characterization of the micro encapsulated crude oil sample was obtained. This analysis indicated the silica cell is largely amorphous silicon dioxide, i.e., approximately 88%, with small amounts of sodium chloride, i.e., approximately 6%. Other trace constituents were shown at trace levels but their identification was tentative due to their small concentrations which approved the noise level for the instrumentation. In an amorphous material, the molecules are joined in a completely random, three-dimensional matrix. This arrangement provides strength and flexibility, making the structure less susceptible to water penetration, more resistant to leaching and provides an extremely long life.

Mass Spectroscopy

Mass spectrometers bombard a substance under investigation with an electron beam and quantitatively records the result as a spectrum of positive ion fragments. The positive ion fragments are separated on the basis of mass. An analysis was conducted employing a mass spectrometer in accordance with a procedure published in *Chemical Geology*, 61 (1987) 1–10. That procedure entitled "Analysis of Volatiles in Fluid Inclusions By Mass Spectrometry" has been adapted to analyze oil inclusions in core samples and is now used to demonstrate the stability of microencapsulation. The procedure entails running a background scan with the mass spectrometer on a sample of oil bearing rock and then crushing the rock internally in the mass spectrometer while running a second scan on the crushed rock. Normally, the background scan shows only random background noise for the oil bearing rock but the second scan of the crushed rock shows a large number of peaks on the resulting mass spectrum corresponding to the various atomic mass units of fragments of the various organic constituents found in the oil itself which are released from the rock upon crushing.

When a background scan of the micro encapsulated sample of crude oil was run, a typical graph showing background noise patterns was obtained. However, upon crushing and running a second scan on the crushed sample, only background noise appeared on the graph. This indicates that the crude oil is not free in the micro encapsulated sample, but is bound up in the structure of the amorphous silica itself.

Conclusion

Although the crude oil was present in the micro encapsulated sample, it was not free but was bound within a silica material. The morphology of the silica material is a matrix having cavernous chambers and pockets. The crude oil is believed to be micro encapsulated in the amorphous, silica matrix and not included in the chambers or pockets as an inclusion, is not adsorbed onto the surface of the matrix, and is not absorbed into the matrix. The silica material is largely amorphous silicon dioxide (silica). Such an amorphous structure is known to be a very stable form as opposed to a highly ordered crystalline structure, such as found in quartz, which can be easily fractured or subject to cleavage. The micro encapsulated sample is very stable to physical force and the encapsulated hydrocarbons and chemicals are not released upon crushing the sample. Hydrocarbons or chemicals appear to be permanently bound within the silica material, and not subject to washing out, leaching, etc.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of micro encapsulating hydrocarbon, chemical or metal contaimination comprising the following steps:
    a) applying an alkaline, aqueous silica solution containing emulsifier to the contaimination which has not been previously pretreated, and
    b) allowing a reaction to occur and a resulting material to dry forming an amorphous silica material in which the hydrocarbons, chemicals and metals are permanently micro encapsulated.

2. A method according to claim 1 further comprising the following step:
    c) removing the dried amorphous silica material.

3. A method of micro encapsulating hydrocarbon, chemical or metal contamination comprising the following steps:
    a) applying an alkaline, aqueous silica solution to the contamination,
    b) mixing the alkaline, aqueous silica solution with the contamination,
    c) adding an acidic polymer solution and again mixing, and
    d) allowing a reaction to occur and a resulting material to dry forming an amorphous silica material in which the hydrocarbons, chemicals and metals are permanently micro encapsulated.

4. A method according to claim 3 wherein odiferous chemicals are permanently micro encapsulated so that the contamination is deodorized.

5. A method according to claim 3 wherein radioactive materials are permanently micro encapsulated so that the radiation emitted from the resulting material is reduced.

6. A method according to claim 3 wherein the acidic polymer solution contains an organic acid.

7. A method according to claim 3 wherein the alkaline, aqueous silica solution contains surfactants and a silicate of an alkali metal.

8. A method according to claim 3 wherein the acidic polymer solution contains an inorganic acid.

9. A method according to claim 8 wherein the inorganic acid is phosphoric acid.

10. A method according to claim 8 wherein the acidic polymer solution contains a polymer which tends to speed up the reaction and dry up the amorphous silica material.

11. A method according to claim 10 wherein the acidic polymer solution contains a buffering agent.

12. A method according to claim 1 wherein the alkaline aqueous silica solution contains surfactants and a silicate of an alkali metal.

13. A method according to claim 1 wherein odiferous chemicals are permanently micro encapsulated so that the contamination is deodorized.

14. A method of micro encapsulating hydrocarbon, chemical or metal contamination comprising the following steps:
   a) applying an alkaline, aqueous silica solution to the contamination, and
   b) allowing a reaction to occur and a resulting material to dry forming an amorphous silica material in which the hydrocarbons, chemicals and metals are permanently micro encapsulated and in which radioactive materials are permanently micro encapsulated so that radiation emitted from the resulting material is reduced.

15. An amorphous silica material formed by the following steps:
   a) applying an alkaline aqueous silica solution containing emulsifiers to a chemical contaminant which has not been previously pretreated, and
   b) allowing physical interactions to occur and a resulting material to dry.

16. An amorphous silica material formed according to the steps of claim 15 further comprising the following steps which occur after step (a) and before step (b):
   c) mixing the alkaline aqueous silica solution with the chemical contaminant, and
   d) adding an acidic aqueous polymer solution and mixing.

* * * * *

UNITED STATES PATENT AND TRADEMARK OFFICE
CERTIFICATE OF CORRECTION

PATENT NO : 5,678,238
DATED : October 14, 1997
INVENTOR(S): Richard Billings; Lyle D. Burns It is certified that error appears in the above-identified patent and that said Letters Patent is hereby corrected as shown below:

On the title page, Item [73],

The Assignees are: Richard Billings, Chelsea, Oklahoma and Terra Environmental Products Company, Bartlesville, Oklahoma.

Signed and Sealed this

Twenty-fourth Day of February, 1998

Attest:

BRUCE LEHMAN

*Attesting Officer*  *Commissioner of Patents and Trademarks*